(12) United States Patent
Zhan et al.

(10) Patent No.: US 7,481,267 B2
(45) Date of Patent: Jan. 27, 2009

(54) ANISOTROPIC THERMAL AND ELECTRICAL APPLICATIONS OF COMPOSITES OF CERAMICS AND CARBON NANOTUBES

(75) Inventors: Guodong Zhan, Boulder, CO (US); Joshua D. Kuntz, Livermore, CA (US); Amiya K. Mukherjee, Davis, CA (US)

(73) Assignee: The Regents of the University of California, Oakland, CA (US)

(*) Notice: Subject to any disclaimer, the term of this patent is extended or adjusted under 35 U.S.C. 154(b) by 791 days.

(21) Appl. No.: 11/136,951

(22) Filed: May 24, 2005

(65) Prior Publication Data

US 2008/0314568 A1 Dec. 25, 2008

Related U.S. Application Data

(63) Continuation-in-part of application No. 10/606,941, filed on Jun. 26, 2003, now Pat. No. 6,976,532.

(51) Int. Cl.
*F28F 7/00* (2006.01)
*C04B 35/00* (2006.01)
*H05K 7/20* (2006.01)

(52) U.S. Cl. .......... 165/185; 165/905; 165/104.11; 501/95.2

(58) Field of Classification Search .......... 165/185, 165/80.4, 104.11, 104.33, 905, 906; 423/447.1; 501/95.1, 95.2; 361/704, 708, 712, 713; 257/703; 428/402
See application file for complete search history.

(56) References Cited

U.S. PATENT DOCUMENTS

| | | | |
|---|---|---|---|
| 4,565,747 A | 1/1986 | Nakae et al. | |
| 4,731,282 A | 3/1988 | Tsukagoshi et al. | |
| 4,756,976 A | 7/1988 | Komeya et al. | |
| 4,889,548 A | 12/1989 | Kriegesmann et al. | |
| 5,338,320 A * | 8/1994 | Fukuda et al. | 29/623.1 |
| 5,445,106 A * | 8/1995 | Einset | 117/1 |
| 5,637,406 A | 6/1997 | Asai et al. | |
| 5,733,484 A * | 3/1998 | Uchida et al. | 264/29.1 |
| 5,738,907 A | 4/1998 | Vaccaro et al. | |
| 5,834,337 A * | 11/1998 | Unger et al. | 438/122 |
| 5,902,542 A * | 5/1999 | Hirao et al. | 264/639 |
| 5,955,148 A | 9/1999 | Shimoda et al. | |
| 5,991,155 A | 11/1999 | Kobayashi et al. | |
| 6,231,998 B1 | 5/2001 | Bowker et al. | |
| 6,284,323 B1 | 9/2001 | Maloney | |
| 6,355,332 B1 | 3/2002 | Kobayashi | |

(Continued)

OTHER PUBLICATIONS

Anstis, G.R. et al.; "A Critical Evaluation of Indentation Techniques for Measuring Fracture Toughness: I, Direct Crack Measurements"; 1981, *Journal of the American Ceramic Society*, vol. 64, No. 9, pp. 533-538.

Baughman, Ray H. et al.; "Carbon Nanotubes-the route Toward Applications"; 2002, *Science*, vol. 297, pp. 787-792.

Bronikowski, Michael J. et al.; "Gas-phase production of carbon single-walled nanotubes from carbon monoxide via the HiPco process: A parametric study"; 2001, *J. Vac. Sci. Technol.*, vol. 19, No. 4, pp. 1800-1805.

(Continued)

*Primary Examiner*—Tho v Duong
(74) *Attorney, Agent, or Firm*—Townsend and Townsend and Crew LLP.; M. Henry Heines (57) ABSTRACT

Ceramic materials are converted to materials with anisotropic thermal properties, electrical properties, or both, by forming the ceramics into composites with carbon nanotubes dispersed therein and uniaxially compressing the composites in a direction in which a lower thermal or electrical conductivity is desired.

46 Claims, 3 Drawing Sheets

U.S. PATENT DOCUMENTS

| | | | |
|---|---|---|---|
| 6,407,922 | B1 | 6/2002 | Eckblad et al. |
| 6,420,293 | B1 | 7/2002 | Chang et al. |
| 6,465,561 | B1 | 10/2002 | Yarbrough et al. |
| 6,475,958 | B1 | 11/2002 | Paul et al. |
| 6,498,726 | B2 | 12/2002 | Fuller et al. |
| 6,573,445 | B1 | 6/2003 | Burgers |
| 6,579,744 | B1 | 6/2003 | Jiang |
| 6,803,135 | B2 * | 10/2004 | Liu et al. .................. 428/701 |
| 6,976,532 | B2 * | 12/2005 | Zhan et al. ................ 165/185 |
| 2002/0038704 | A1 * | 4/2002 | Houle et al. ............... 165/185 |
| 2002/0061396 | A1 | 5/2002 | White |
| 2002/0124932 | A1 | 9/2002 | Blain et al. |
| 2002/0130407 | A1 | 9/2002 | Dahl et al. |
| 2003/0077478 | A1 | 4/2003 | Dani et al. |
| 2003/0096104 | A1 * | 5/2003 | Tobita et al. ............... 428/332 |
| 2003/0111333 | A1 * | 6/2003 | Montgomery et al. ....... 204/164 |
| 2003/0117770 | A1 | 6/2003 | Montgomery et al. |
| 2003/0151030 | A1 | 8/2003 | Gurin |
| 2004/0009353 | A1 | 1/2004 | Knowles et al. |

OTHER PUBLICATIONS

Flahaut, E. et al.; "Carbon Nanotube-Metal-Oxide Nanocomposites: Microstructure, Electrical Conductivity and Mechanical Properties"; 2000, *Acta Mater.*, vol. 48, pp. 3803-3812.

Karlsson et al., "The effect of the thermal barrier coating on the displacement instability in thermal barrier systems", *Acta Materialia* 50: 1211-1218 (2002).

Koumoto, Kunihito et al.; "Thermoelectric properties of single crystal $CuAlO_2$ with a layered structure"; *J. Mater. Chem.*, vol. 11, pp. 251-252.

Kovtyukhova, Nina I. et al.; "Ultrathin Anisotropic Films Assembled from Individual Single-Walled Carbon Nanotubes and Amine Polymers"; 2004, *J. Phys. Chem. B*, pp. A-F.

Laurent, Ch. et al.; "Carbon Nanotube-Fe-Alumina Nanocomposites. Part II: Microstructure and Mechanical Properties of the Hot-Pressed Composites"; 1998, *Journal of the European Ceramic Society*, vol. 18, pp. 2005-2013.

Nikolaev, Pavel et al.; "Gas-phase catalytic growth of single-walled carbon nanotubes from carbon monoxide"; 1999, *Chemical Physics Letters*, vol. 313, pp. 91-97.

Omori, Mamoru, "Sintering, consolidation, reaction and crystal growth by the spark plasma system (SPS)"; 2000, *Materials Science and Engineering*, vol. A287, pp. 183-188.

Peigney, A. et al.; "Carbon nanotubes grown *in situ* by a novel catalytic method"; 1997, *J. Mater. Res.*, vol. 12, No. 3, pp. 613-615.

Peigney, A. et al.; "Carbon Nanotubes-Fe-Alumina Nanocomposites. Part I: Influence of the Fe Content on the Synthesis of Powders"; 1998, *Journal of the European Ceramic Society*, vol. 18, pp. 1995-2004.

Peigney, A. et al.; "Carbon nanotubes in novel ceramic matrix nanocomposites"; 2000, *Ceramic International*, vol. 26, pp. 677-683.

Peigney, A. et al.; "Aligned carbon nanotubes in ceramic-matrix nanocomposites prepared by high-temperature extrusion"; 2002, *Chemical Physics Letters*, vol. 352, pp. 20-25.

Sandler, J. et al.; "Development of a dispersion process for carbon nanotubes in an epoxy matrix and the resulting electrical properties"; 1999, *Polymer*, vol. 40, pp. 5967-5971.

Sharafat et al., "Development of composite thermal barrier coatings with anisotropic microstructure", *Vacuum* 59: 185-193 (2000).

Siegel, R.W. et al.; "Mechanical Behavior of Polymer and Ceramic Matrix Nanocomposites"; 2001, *Scripta mater.*, vol. 44, pp. 2061-2064.

Thess, Andreas, et al.; "Crystalline Ropes of Metallic Carbon Nanotubes"; 1996, *Science*, vol. 273, No. 5274, pp. 483-487.

Xu, C.L. et al.; "Fabrication of aluminum-carbon nanotube composites and their electrical properties"; 1999, *Carbon*, vol. 37, pp. 855-858.

Yoshino, Katsumi et al.; "Electrical and Optical Properties of Conducting Polymer-Fullerene and Conducting Polymer-Carbon Nanotube Composites"; 1999, *Fullerene Science and Technology*, vol. 7, No. 4, pp. 695-711.

Zhan, Guo-Dong et al.; "Electrical properties of nanoceramics reinforced with ropes of single-walled carbon nanotubes"; 2003, *Applied Physics Letters*, vol. 83, No. 6, pp. 1228-1230.

Zhan, Guo-Dong et al.; "Single-wall carbon nanotubes as attractive toughening agents in alumina-based nanocomposites"; 2003, *Nature Materials*, vol. 2, pp. 38-42.

"Advances in Electrically Conductive Materials: Session I"; 1997, *TMS Annual Meeting*, 3 pages.

"Research Programs in Materials Reliability Division: Physical Properties of Thin Films and Nanostructures" http://www.boulder.nist.gov/div853/Program5_physprop.htm.

* cited by examiner

ANISOTROPIC THERMAL AND ELECTRICAL APPLICATIONS OF COMPOSITES OF CERAMICS AND CARBON NANOTUBES

CROSS REFERENCE TO RELATED APPLICATION

This is a continuation-in-part of co-pending application Ser. No. 10/606,941, filed Jun. 26, 2003, the contents of which are incorporated herein in their entirety.

STATEMENT AS TO RIGHTS TO INVENTIONS MADE UNDER FEDERALLY SPONSORED RESEARCH OR DEVELOPMENT

This invention was made with Government support by Grant (or Contract) No. G-DAAD 19-00-1-0185, awarded by the U.S. Army Research Office. The Government has certain rights in this invention.

BACKGROUND OF THE INVENTION

1. Field of the Invention

This invention resides in the field of anisotropic thermal barriers and heat-spreading materials and to materials with anisotropic electrical conductivity, and further relates to ceramics, particularly of nanocrystalline structure, and carbon nanotubes.

2. Description of the Prior Art

Anisotropic thermal diffusivity is a quality that is sought in materials that are used in a wide range of applications, extending from a miniature scale such as components in the microelectronics industry to those of a relatively large scale such as structural components in aircraft engines. Coatings, layers, or components that conduct heat at a lower rate in one direction than in another direction that is orthogonal to the first are useful in dissipating heat to avoid localized hot spots or to insulate the surfaces of components from high-temperature environments. Heat dissipation, or heat-spreading, layers or coatings are used in microprocessors and integrated circuit packages to overcome the increased risk of damage due to the high power of the circuitry elements. The heat sinks in these devices must be lightweight and compact and yet able to absorb the heat from exothermic (heat-generating) electronic components in a highly efficient manner. The interposition of a heat-spreading layer between the exothermic element and the heat sink will cause the heat to travel laterally to extend over a broad heat sink area, adding significantly to the effectiveness of the heat sink. On a larger scale, the ability to spread heat laterally is useful in thermal barrier coatings such as those commonly used on high-temperature components in turbine engines as well as high-temperature reactors and spacecraft.

Thermal barrier coatings of anisotropic thermal conductivity have been formed by various methods, examples of which are thermal spraying, electron beam-physical vapor deposition, plasma spraying, and the use of materials such as graphites that possess a natural anisotropic crystal orientation that can be enhanced by roll pressing. Other anisotropic thermal materials include sintered aluminum nitride, carbon/carbon fiber composites, aerogels impregnated with ceramic fibers such as zirconium dioxide, silicon nitride, silicon carbide, alumina, and zirconium aluminate, and multilayered materials of various kinds.

Anisotropic electrical conductivity is likewise sought in many applications. These include electronic devices where static is sought to be eliminated by dissipating electric charges in a plane without transmitting them across the plane, ultra-high density circuit interconnections in which the close proximity of the leads raises a risk of short circuits, solder-free connections, thermoelectric applications where a maximal rate of heat transfer in a particular direction is sought by restricting the flow of electricity to one axis, photovoltaic cells where high lateral electrical conductivity is needed to transmit an electrical current to the edges of the cells without loss in the transverse direction, and high-temperature superconductors. Methods of achieving the desired anisotropy have included the use of anisotropic conductive adhesives, as disclosed by Jiang, T., et al., U.S. Pat. No. 6,579,744 (Jun. 17, 2003), the use of discontinuous conductors, as disclosed by Paul, W., et al., U.S. Pat. No. 6,475,958 (Nov. 5, 2002), polymeric foams, as disclosed by Vaccaro, A. J., et al., U.S. Pat. No. 5,738,907 (Apr. 14, 1998), specialized metallization patterns, as disclosed by Burgers, A. R. et al., U.S. Pat. No. 6,573,445 (Jun. 3, 2003), and layered crystal structures, as disclosed by Koumoto, K., et al., "Thermoelectric properties of single crystal $CuAlO_2$ with a layered structure," *J. Mater. Chem.* 11: 251-252 (2001).

SUMMARY OF THE INVENTION

It has now been discovered that a ceramic can be transformed into a material exhibiting anisotropic thermal diffusivity, electrical conductivity, or both by combining the ceramic with single-wall carbon nanotubes to form a composite, consolidating the composite into a continuous mass, and uniaxially compressing the composite during consolidation. For thermal applications, the resulting product has a thermal conductivity along the direction of compression that is significantly lower than the thermal conductivity in directions transverse to the direction of compression. The composite can thus be formed as a film or sheet with a low thermal conductivity in the direction extending from one face of the film or sheet to the other and a high thermal conductivity in the direction within the plane of the film or sheet. The composite can also be formed in other shapes such as bars, disks or blocks with a similar difference in thermal conductivity between two orthogonal directions. The inclusion of the carbon nanotubes in the composites enhances the response of the material to the uniaxial compression by increasing the resulting difference in thermal conductivity between the direction of compression and directions transverse to the direction of compression. Thus, in ceramics in which uniaxial compression effects no change in the thermal conductivity, the carbon nanotubes cause a change to occur either primarily or entirely in one direction and to a lesser extent or not at all in other directions. Preferred methods of compression are hot-pressing or other sintering methods, and the most preferred is electric field-assisted sintering, also known as spark plasma sintering.

For electrical applications, the product has an increased electrical conductivity in directions transverse to the direction of compression and a ratio of conductivity in the transverse direction to conductivity in the direction of compression that is unusually high, for example 1,000:1 or higher, and in some cases 2,000:1 or higher or as much as 2,500:1 or higher.

This invention thus resides in microelectronics devices, semiconductor packages, printed circuit boards, and other devices that contain small electronic components that cause highly localized heat generation during use or that require a large difference in electrical conductivity between transverse directions, and in blades and other components of gas turbine engines, high-temperature reactors, and any vessel walls or structural components that are exposed to high-temperature environments, such devices or components having a coating, layer, or section that is formed of a uniaxially compressed composite of carbon nanotubes in a ceramic matrix. The composite can thus be a layer interposed between an exothermic device and a heat sink, or it may serve as a heat sink itself, or it may be a layer protecting a structure component from an environment, or it may constitute the entire structural material itself. The composite can also be a layer interposed between a charged surface or an electrode and an uncharged surface or element. Use of the anisotropic composite offers the advantages of a longer useful life of components and equipment, greater reliability in performance, and greater ability to withstand extreme temperature or electrical conditions. Examples of applications in which the composite will be useful are microelectronics devices, microwave devices, consumer products, medical devices, batteries, solid oxide fuel cells, chemical sensors, and equipment used in the aerospace and defense industries.

DETAILED DESCRIPTION OF THE INVENTION AND PREFERRED EMBODIMENTS

Ceramic materials that can be used as the major component of the composites of this invention include ceramics in general, although preferred ceramics for use in this invention are metal oxides. Examples of metal oxide ceramics are alumina, magnesium oxide, zirconia, magnesia spinel, titania, calcium aluminate, cerium oxide, chromium oxide, and hafnium oxide. Further examples are combinations that include non-metal oxides such as silica. Still further examples are metallic oxides that also contain elements in addition to metals and oxygen, such as SiAlON and AlON. A metal oxide that is currently of particular interest is alumina, either $\alpha$-alumina, $\gamma$-alumina, or a mixture of both. When $\gamma$-alumina is used as part or all of the starting material, the $\gamma$-alumina will often convert to $\alpha$-alumina during the consolidation.

Carbon nanotubes are polymers of pure carbon. Both single-wall and multi-wall carbon nanotubes can be used in the practice of this invention, although single-wall carbon nanotubes are preferred. Single-wall and multi-wall carbon nanotubes are known in the art and the subject of a considerable body of published literature. Examples of literature describing carbon nanotubes are Dresselhaus, M. S., et al., *Science of Fullerenes and Carbon Nanotubes*, Academic Press, San Diego (1996), and Ajayan, P. M., et al., "Nanometre-Size Tubes of Carbon," *Rep. Prog. Phys.* 60 (1997): 1025-1062. The structure of a single-wall carbon nanotube can be described as a single graphene sheet rolled into a seamless cylinder whose ends are either open or closed. When closed, the ends are capped either by half fullerenes or by more complex structures such as pentagonal lattices. The average diameter of a single-wall carbon nanotube is within the range of 0.5 to 100 nm, and more typically, 0.5 to 10 nm, 0.5 to 5 nm, or 0.7 to 2 nm. The aspect ratio, i.e., length to diameter, can range from about 25 to about 1,000,000, and commonly from about 100 to about 1,000. Thus, a nanotube of 1 nm diameter may have a length of from about 100 to about 1,000 nm. (All ranges stated herein are approximate.) Nanotubes frequently exist as "ropes," which are bundles of 10 to 500 single-wall nanotubes held together along their lengths by van der Waals forces. Individual nanotubes often branch off from a rope to join nanotubes of other ropes. Multi-walled carbon nanotubes are two or more concentric cylinders of graphene sheets. The cylinders are of successively larger diameter to fit one inside another, forming a layered composite tube bonded together by van der Waals forces, the distance between layers typically being approximately 0.34 nm as reported by Peigney, A., et al., "Carbon nanotubes in novel ceramic matrix nanocomposites," *Ceram. Inter.* 26 (2000) 677-683.

Carbon nanotubes are commonly prepared by arc discharge between carbon electrodes in an inert gas atmosphere. The product is generally a mixture of single-wall and multi-wall nanotubes, although the formation of single-wall nanotubes can be favored by the use of transition metal catalysts such as iron or cobalt. Single-wall nanotubes can also be prepared by laser ablation, as disclosed by Thess, A., et al., "Crystalline Ropes of Metallic Carbon Nanotubes," *Science* 273 (1996): 483-487, and by Witanachi, S., et al., "Role of Temporal Delay in Dual-Laser Ablated Plumes," *J. Vac. Sci. Technol. A* 3 (1995): 1171-1174. A further method of producing single-wall nanotubes is the HiPco process disclosed by Nikolaev, P., et al., "Gas-phase catalytic growth of single-walled carbon nanotubes from carbon monoxide," *Chem. Phys. Lett.* 313, 91-97 (1999), and by Bronikowski M. J., et al., "Gas-phase production of carbon single-walled nanotubes from carbon monoxide via the HiPco process: A parametric study," *J. Vac. Sci. Technol.* 19, 1800-1805 (2001).

The starting materials for the composites of this invention are preferably powder mixtures of the ceramic material and the carbon nanotubes. The particle size of the ceramic component can vary while still achieving the benefits of the presence of the carbon nanotubes when consolidated and densified. The particles can be micron-sized, sub-micron-sized, or nano-sized. The term "micron-sized" refers to particles having diameters that are greater than 1 micron, "sub-micron-sized" refers to particles whose diameters are within the range of 100 nm to 1,000 nm, typically 150 nm or above, and "nano-sized" refers to particles whose diameters are less than 100 nm, particularly 50 nm or below. As the particle size of the starting ceramic material decreases, the final density of the sintered composite product increases when using the same consolidation parameters. Accordingly, particles that are less than 500 nm in diameter on the average are preferred, and those that are less than 100 nm in diameter are particularly preferred.

The powder mixtures used as starting materials, as well as the compressed composites formed from the starting materials, may contain single-wall or multi-wall carbon nanotubes, or mixtures of single- and multi-wall carbon nanotubes. It is preferred however that the mixtures, and the final product as well, be free of all carbon nanotubes except single-wall carbon nanotubes, or if double-wall or multi-wall carbon nanotubes are present, that the carbon nanotubes in the mixture be predominantly single-wall carbon nanotubes. The term "predominantly" in this context is used herein to mean that either no multi-wall carbon nanotubes are present or that the amount of carbon nanotubes having more than a single wall is so small relative to the amount of single-wall nanotubes that the multi-wall nanotubes do not obliterate or significantly reduce the beneficial properties of the composite that are attributable to the single-wall nanotubes.

The relative amounts of ceramic material and carbon nanotubes can vary, although the mechanical properties and possibly the performance characteristics may vary with the proportions of the carbon nanotubes. In most cases, best results will be achieved with composites in which the carbon nanotubes constitute from about 1% to about 50%, preferably from about 2.5% to about 25%, and most preferably from about 5% to about 20%, by volume of the composite. The volumes used in determining the volume percents referred to herein are calculated from the weight percents of the bulk starting materials and the theoretical density of each component.

The carbon nanotubes can be dispersed through the ceramic powder by conventional means to form a homogeneously dispersed powder mixture, although a preferred method is one in which the materials are mixed by being suspended together in a common liquid suspending medium. Any readily removable, low-viscosity, inert suspending liquid, such as a low molecular weight alcohol (ethanol, for example), can be used. Carbon nanotubes are available from commercial suppliers in a paper-like form, and can be dispersed in ethanol and other liquid suspending agents with the assistance of ultrasound.

A preferred means of mixing the ceramic particles and the carbon nanotubes is by ball-milling in conventional rotary mills with the assistance of tumbling balls. The sizes of the balls, the number of balls used per unit volume of powder, the rotation speed of the mill, the temperature at which the milling is performed, and the length of time that milling is continued can all vary widely. Best results will generally be achieved by wet milling, i.e., milling the particles while dispersed in a liquid such as ethanol, with a milling time ranging from about 4 hours to about 50 hours. The degree of mixing may also be affected by the "charge ratio," which is the ratio of the mass of the balls to the mass of the powder. A charge ratio of from about 20 to about 100 will generally provide proper mixing.

The qualities of the product can be enhanced by mechanical activation of the ceramic particles prior to consolidating them into a composite. Mechanical activation is likewise achieved by methods known in the art and is typically performed in centrifugal or planetary mills that apply centrifugal and/or planetary action to the powder mixture with the assistance of grinding balls. The grinding balls produce impacts of up to 20 g (20 times the acceleration due to gravity). Variables such as the sizes of the milling balls, the number of milling balls used per unit amount of powder, the temperature at which the milling is performed, the length of time that milling is continued, and the energy level of the mill such as the rotational speed or the frequency of impacts, can vary widely. The number and size of the milling balls relative to the amount of powder is typically expressed as the "charge ratio," which is defined as the ratio of the mass of the milling balls to the mass of the powder. A charge ratio of at least about 5, preferably about 5 to about 20, and most preferably about 10 to about 15, will generally provide the best results. Preferred milling frequencies are at least about 3, and preferably about 3 to 30 cycles per second or, assuming two impacts per cycle, at least about 6, and preferably about 6 to about 60 impacts per second.

Uniaxial compression during consolidation can be achieved by conventional means. The benefits of the invention will be most evident when the composite is densified to a high density, i.e., one that approaches full theoretical density, which is the density of the material as determined by volume-averaging the densities of each of its components. The term "relative density" is used herein to denote the actual density expressed as a percent of the theoretical density. It is believed that favorable results will be achieved with a relative density of 90% or above, with best results at a relative density of at least 95%, preferably at least 98%, and most preferably at least 99%.

In the practice of this invention, uniaxial compression is preferably performed in combination with electric field-assisted sintering. One method of performing this type of sintering is by passing a pulsewise DC electric current through the dry powder mixture or through a consolidated mass of the mixture while applying pressure. A description of electric field-assisted sintering and of apparatus in which this process can be performed is presented by Wang, S. W., et al., "Densification of $Al_2O_3$ powder using spark plasma sintering," *J. Mater. Res.* 15(4), 982-987 (2000). While the conditions may vary, best results will generally be obtained with a densification pressure exceeding 10 MPa, preferably from about 10 MPa to about 200 MPa, and most preferably from about 40 MPa to about 100 MPa. The preferred current is a pulsed DC current of from about 250 $A/cm^2$ to about 10,000 $A/cm^2$, most preferably from about 500 $A/cm^2$ to about 1,500 $A/cm^2$. The duration of the pulsed current will generally range from about 1 minute to about 30 minutes, and preferably from about 1.5 minutes to about 5 minutes. Preferred temperatures are within the range of from about 800° C. to about 1,500° C., and most preferably from about 900° C. to about 1,400° C. The compression and sintering are preferably performed under vacuum. Preferred vacuum levels for the densification are below 10 Torr, and most preferably below 1 Torr.

The reduction in thermal conductivity in the direction of compression that is achieved by the practice of this invention can vary from less than 50% to greater than 90%, and accordingly the ratio of the thermal conductivity in the direction of compression to that in directions that are transverse to the direction of compression can vary from greater than 0.5 to less than 0.1. In preferred embodiments, this thermal conductivity ratio is about 0.4 or less, preferably about 0.25 or less. The terms "thermal diffusivity" and "thermal conductivity" are used interchangeably herein. The increase in electrical conductivity in directions transverse to the direction of compression can vary from 50% to greater Than 300%, and accordingly the electrical conductivity in directions transverse to the direction of compression can be as high as 2,000 S/m, or even 3,000 S/m or 4,000 S/m or higher, at 25° C., and the ratio of the electrical conductivity in directions transverse to the direction of compression to that in the direction of compression can be as high as 1,000:1 or higher, and in some cases 2,000:1 or higher or as much as 2,500:1 or higher.

For electrical applications, the composite can be formed into a layer or coating to serve as an electrical insulator or in-plane dissipater, or can be cut into strips or leads of extremely fine width. Further applications and configurations will be readily apparent to those skilled in the art.

In both cases, the advanced properties are accompanied by high corrosion resistance, high strength, high toughness, and light weight. This combination of properties makes these materials highly useful and effective for a wide range of applications.

Figure 1:
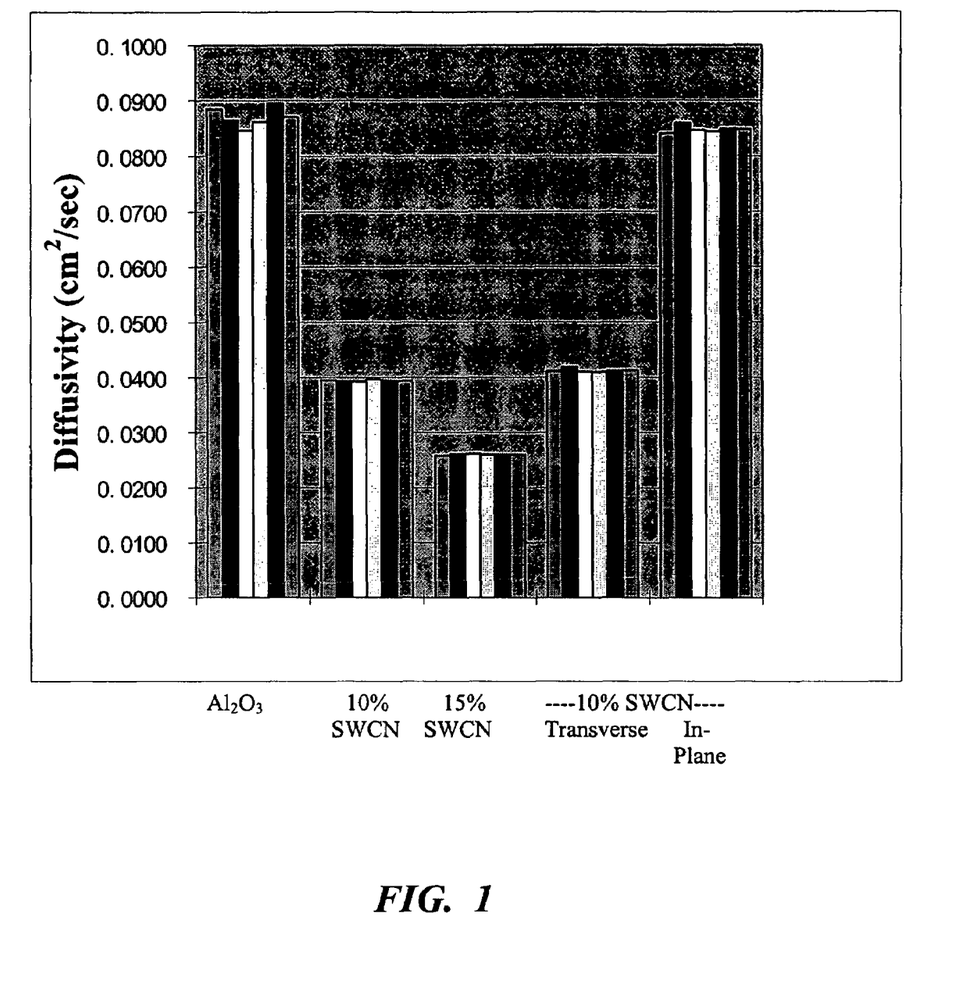
FIG. 1 is a bar graph comparing thermal diffusivities of various materials both within and outside of the present invention and in different orientations.
Figure 2:
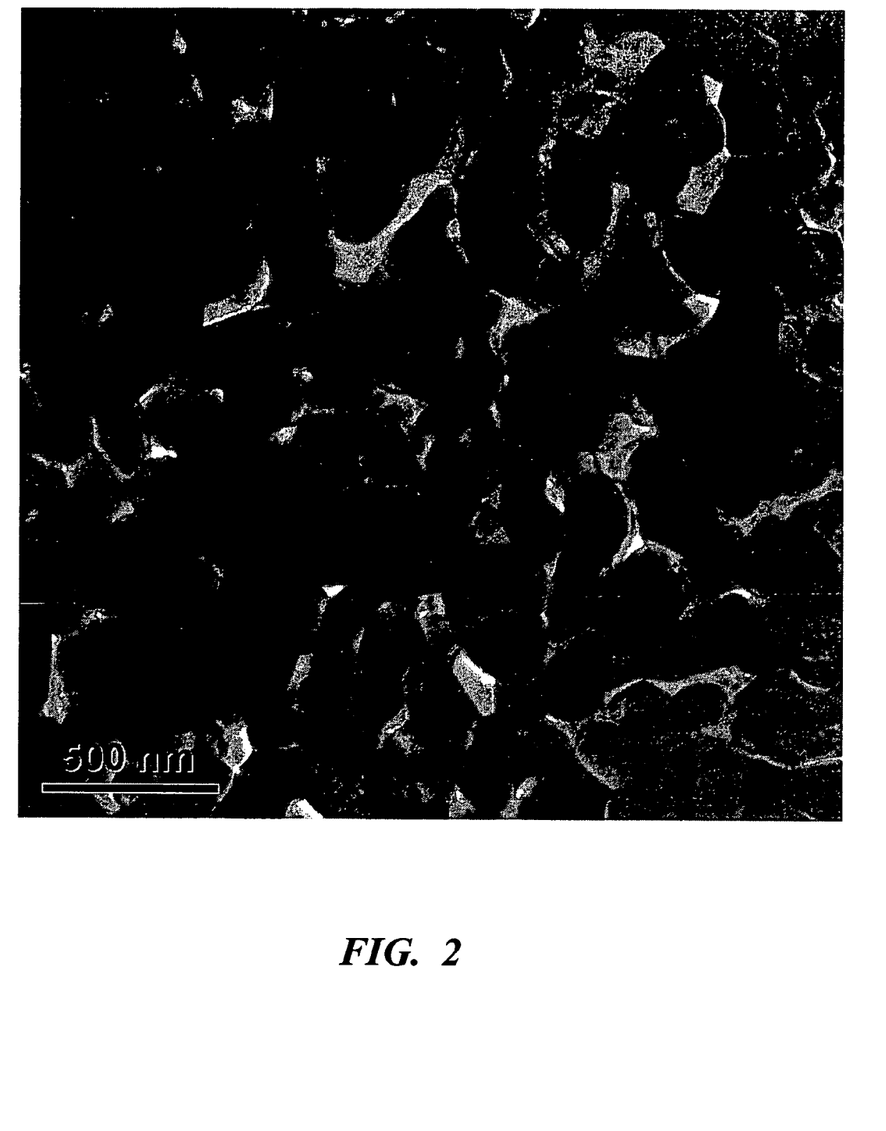
FIG. 2 is a transmission electron microscope image of a composite prepared in accordance with the present invention.
Figure 3:
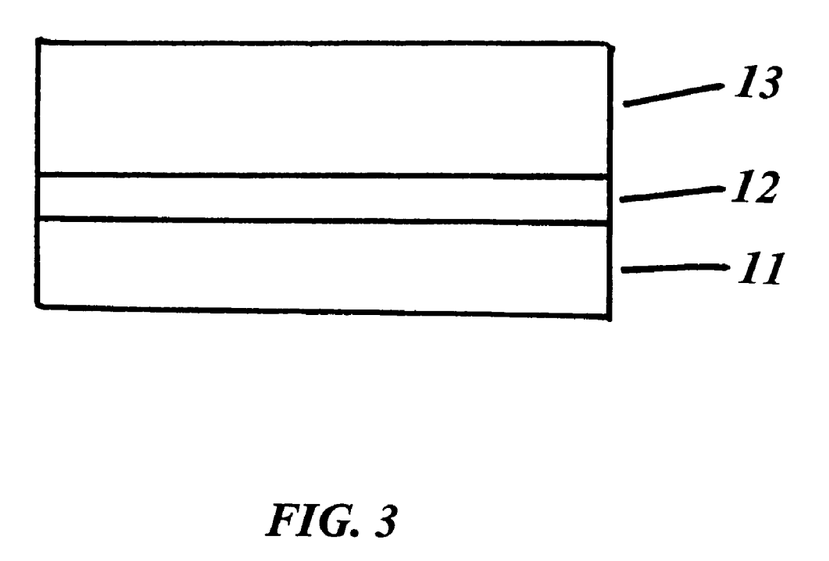
FIG. 3 is a representation of a structure in accordance with the invention.

FIGS. 1 and 2 are explained in the Examples below. FIG. 3 is a representation of the invention, showing a device 11 which is either an exothermic device such as a microprocessor device or a charged component such as an electrode or electric lead, a heat spreading or charge spreading layer 12, and a component 13 that is either a heat sink or a component (such as a separate electrically conductive lead) to be shielded from the charge in the charged component 11.

The following examples are offered for purposes of illustration and are not intended to limit the scope of the invention.

EXAMPLE 1

Alumina powder, consisting of 80% α-Al$_2$O$_3$ and 20% γ-Al$_2$O$_3$ with particle sizes of 300 nm (40 nm crystallite size) and 20 nm, respectively, was obtained from Baikowski International Corporation (Charlotte, N.C., USA). Gas condensation synthesized γ-Al$_2$O$_3$ with average particle sizes of 15 nm and 32 nm was obtained from Nanotechnologies Inc. (Austin, Tex., USA) and Nanophase Technologies Corporation (Darien, Ill., USA), respectively. Purified single-wall carbon nanotubes (SWCN) in paper form, produced by the HiPco process with more than 90% of the catalyst particles removed were obtained from Carbon Nanotechnologies (Houston, Tex., USA). The SWCN were dispersed in ethanol with the assistance of ultrasound. The alumina was then mixed with the SWCN dispersion, and the combined dispersion was sieved using a 200-mesh sieve, then ball-milled for 24 hours (still in ethanol) using zirconia milling media, and then dried to form a dry powder mixture. An alumina-SWCN mixture at 10% SWCN, by volume, was prepared in this manner.

For certain experiments, the alumina was mechanically activated by high-energy ball milling prior to being combined with the SWCN. The high-energy ball milling was performed with 1 weight percent polyvinyl alcohol on a Spex 8000 mixer mill (Spex Industries, Metuchen, N.J., USA) in a zirconia vial. The polyvinyl alcohol was included to prevent severe agglomeration of the powder. Milling was performed at room temperature for 24 hours, after which time the polyvinyl alcohol was removed by heating the powder at 350° C. for 3 hours under vacuum. The alumina was then mixed with the SWCN dispersion, and the combined dispersion was sieved, ball-milled, and dried as described above. An alumina-SWCN mixture at 15% SWCN, by volume, was prepared in this manner.

To consolidate and densify the powder mixtures, each powder mixture was placed on a graphite die of inner diameter 19 mm and cold-pressed at 200 MPa. The cold-pressed powder mixture was then sintered on a Dr. Sinter 1050 Spark Plasma Sintering System (Sumitomo Coal Mining Company, Japan) under vacuum. Electric field-assisted sintering was then performed at an applied pressure of 80 MPa with a pulsed DC current of about 5,000 A maximum and a maximum voltage of 10 V. The pulses had a period of about 3 ms and followed a pattern of 12 cycles on and 2 cycles off. Once the pressure was applied, the samples were heated to 600° C. in 2 minutes and then heated further at rates of 550° C./min to 600° C./min to 1,150-1200° C. where they were held for 3-5 minutes. The temperature was monitored with an optical pyrometer focused on a depression in the graphite die measuring 2 mm in diameter and 5 mm in depth. The resulting sintered compacts were disks measuring 19 mm in diameter and 1.5 to 3 mm in thickness. For those powders that were consolidated and densified in this manner without prior mechanical activation, a sintering temperature was used that was higher by 50 degrees Celsius than the sintering temperature used on the powders that had been mechanically activated.

The final densities of the sintered compacts were measured by the Archimedes method using deionized water as the immersion medium. The density of the SWCN used as a starting material was 1.8 g/cm$^3$. Microstructure determinations of the sintered compacts were performed with an FEI XL30-SFEG high-resolution scanning electron microscope (SEM) with a resolution better than 2 nm. Grain sizes were estimated from the SEM determinations on fracture surfaces together with X-ray diffraction profiles. Additional characterizations by analytical electron microscopy and high-resolution transmission electron microscopy (TEM) were performed on a Philips CM-200 with a field emission gun operating at 200 kV.

Thermal diffusivity measurements were performed by the use of a Xenon Flash Thermal Diffusivity System both on the sintered disks and on rectangular bars measuring 3-6 mm×15-16 mm cut from the sintered disks. The measurements were taken in two orientations, i.e., the orientation along the uniaxial compression axis, which is referred to herein as the "transverse" orientation since it was transverse to the flat surfaces of the specimen disk, and the orientation perpendicular to the hot-pressing direction, which is referred to herein as the "in-plane" direction since it was in the plane of the disk. For each orientation, the measurement was performed by applying a short heat pulse (less than 1 millisecond in duration) to one surface of the disk or bar using a xenon flash lamp, while using an InSb infrared detector to measure the temperature change at the surface across from the surface to which the pulse was applied, the direction normal to the two surfaces defining the orientation being measured.

Table I below lists the starting materials used, the processing conditions, and the characteristics of the products, including the relative density, grain size, and thermal conductivities, with separate measurements for thermal conductivities in the transverse and in-plane orientations. The starting particle sizes shown in the table are averages on a volume basis.

TABLE I

Oriented Thermal Conductivities for SWCN-Alumina Composites Sintered by Spark Plasma Sintering

| No. | Specimen Composition and Starting Particle Size | Processing Conditions | Relative Density (%) | Product Grain Size (nm) | Thermal Conductivity (W/mK at 25° C.) Transverse | In-Plane |
|---|---|---|---|---|---|---|
| (1) | Pure Al$_2$O$_3$ (80% α; 300 nm; 20% γ, 20 nm) | SPS/ 1150° C./ 3 min | 100 | 349 | 27.3 | 27.3 |
| (2) | γ-Al$_2$O$_3$ with 10% SWCN; 32 nm | SPS/ 1200° C./ 3 min | 98 | ~100 | 11.4 | 24.0 |
| (3) | γ-Al$_2$O$_3$ with 15% SWCN; 15 nm | SPS/ 1150° C./ 3 min | 99.2 | ~100 | 7.3 | — |

FIG. 1 is a bar graph showing the thermal diffusivities of various samples, each set of bars representing five individual tests (the five bars of each set beginning with the left bar as the first) and an average of the five values (the bar at the right of each set). The first three sets of bars each represent measurements taken directly on sintered disks in the transverse direction, while the last two sets represent measurements taken on bars cut from sintered disks, the measurements taken in the transverse and in-plane directions. The first set, labeled "Al$_2$O$_3$," represents disks of alumina corresponding to the first row of Table I and containing no SWCN. The second and third sets represent the SWCN-containing composites, with 10% and 15% SWCN, respectively. The fourth and fifth sets of bars represent the SWCN-containing composite with 10% SWCN. The data shown in FIG. 1 are listed in Table II below.

TABLE II

Thermal Diffusivities for Alumina and SWCN-Alumina Composites Sintered by Spark Plasma Sintering (Data Shown in FIG. 1)

| Test No. | $Al_2O_3$ Disks | 10% SWCN Disks | 15% SWCN Disks | 10% SWCN Bars Transverse | In-Plane |
|---|---|---|---|---|---|
| 1 | 0.0884 | 0.0395 | 0.0258 | 0.0411 | 0.0840 |
| 2 | 0.0864 | 0.0392 | 0.0261 | 0.0419 | 0.0859 |
| 3 | 0.0846 | 0.0392 | 0.0262 | 0.0410 | 0.0846 |
| 4 | 0.0862 | 0.0396 | 0.0260 | 0.04409 | 0.0844 |
| 5 | 0.0895 | 0.0394 | 0.0260 | 0.0411 | 0.0849 |
| Average | 0.0870 | 0.0394 | 0.0260 | 0.0412 | 0.0848 |

The data in both Tables I and II and the bar graph show that the in-plane thermal conductivities (i.e., the conductivity perpendicular to the uniaxial compression axis) and in-plane diffusivities of the sintered samples are approximately the same regardless of whether the samples are pure alumina or composites of alumina and carbon nanotubes. By contrast, the transverse thermal conductivities and diffusivities (i.e., those measured along the hot-pressing direction) are significantly decreased when the carbon nanotubes are present, and that an increase in the level of carbon nanotubes produces a greater drop in thermal conductivity or diffusivity in the transverse direction. In the composite containing 15% SWCN, the transverse thermal characteristic is reduced to approximately one fourth of that of the pure alumina.

The microstructure of the sintered 10% SWCN composite was observed by transmission electron microscopy (TEM), and the image is shown in FIG. 2. In this image, the light regions are filled with carbon nanotubes. The image shows that the carbon nanotubes are homogeneously dispersed throughout the alumina grains, with a minor level of agglomeration. The carbon nanotubes appear as ropes entangled with the alumina grains to form a network structure.

Analyses by X-ray diffraction showed that the alumina in all sintered samples was entirely α-alumina.

EXAMPLE 2

Materials, Equipment, and Experimental Procedures

Nanocrystalline 3Y-TZP (3 mol % yttria-stabilized tetragonal zirconia polycrystals) with an average particle size of 28 nm were obtained from Nanophase Technologies Corporation (Darien, Ill., USA). Purified single-wall carbon nanotubes, produced by the HiPco process with more than 90% of the catalyst particles removed, were obtained from Carbon Nanotechnologies (Houston, Tex., USA). The carbon nanotubes were dispersed in ethanol and the assistance of ultrasound. The 3Y-TZP nanopowder was then added to the nanotube dispersion, and the combined dispersion was sieved with a 200-mesh sieve, then ball-milled for 24 hours (in ethanol) using zirconia milling media, then dried to form a dry powder mixture. The proportions used were such that the final mixture consisted of 10% single-wall carbon nanotubes by volume and the remainder 3Y-TZP. For comparison, a sample of the same nanocrystalline 3Y-TZP was used without the carbon nanotubes.

For further comparisons, γ-alumina as used as the ceramic in place of 3Y-TZP. The γ-alumina, obtained from Nanophase Technologies Corporation, was synthesized by gas condensation. Two batches were used, one with an average particle size of 15 nm and the other with an average particle size of 32 nm. The 15-nm alumina was mechanically activated by high-energy ball milling, performed on a Spex 8000 mixer mill (Spex Industries, Metuchen, N.J., USA) in a zirconia vial with 1 weight percent polyvinyl alcohol, a dry milling agent, to prevent severe powder agglomeration. Milling was performed at room temperature for 24 hours, followed by a vacuum heat treatment at 350° C. for 3 hours to remove the polyvinyl alcohol. Thus milled, the 15-nm γ-alumina particles were mixed with the single-wall carbon nanotube dispersion by the same procedure used for the 3Y-TZP, to form a mixture containing 15 volume percent carbon nanotubes. The 32-nm γ-alumina particles were likewise mixed with the single-wall carbon nanotube dispersion to form a mixture containing 10 volume percent carbon nanotubes, but without prior mechanical activation of the alumina. In both cases, the resulting dispersions were sieved using a 200-mesh sieve, then ball-milled for 24 hours (still in ethanol) using zirconia milling media, then dried to form a dry powder mixture.

All dry powder samples, including those containing alumina mechanically activated by high-energy ball milling and those containing alumina that had not been activated, were placed on a graphite die of inner diameter 20 mm and cold-pressed at 200 MPa. The cold-pressed powder mixture was then sintered on a Dr. Sinter 1050 Spark Plasma Sintering System (Sumitomo Coal Mining Company, Japan) under vacuum. Electric field-assisted sintering was then performed at an applied pressure of 80 MPa with a pulsed DC current of 5,000 A maximum and a maximum voltage of 10 V. The pulses were 12 ms in duration separated by intervals of 2 ms. Once the pressure was applied, the samples were heated to 600° C. in 2 minutes and then heated further at rates of 550° C./min to a final sintering temperature where they were held for either 3 or 4 minutes. Since γ-alumina nanopowder is consolidate to full density by electric field-assisted sintering at 1,200° C. for three minutes, the specimen containing non-activated γ-alumina and carbon nanotubes was sintered at these conditions. By contrast, the specimen containing the mechanically activated γ-alumina and the carbon nanotubes was sintered at 1,150° C. for three minutes. In all cases, the temperature was monitored with an optical pyrometer focused on a depression in the graphite die measuring 2 mm in diameter and 5 mm in depth.

The final densities of the sintered compacts were measured by the Archimedes method using deionized water as the immersion medium. The density of the single-wall carbon nanotubes used as a starting material was 1.8 g/cm³. Microstructure determinations of the sintered compacts were performed with an FEI XL30-SFEG high-resolution scanning electron microscope with a resolution better than 2 nm. Grain sizes were estimated by high-resolution scanning electron microscopy of fracture surfaces. An Agilent 34420A nano-Volt/microOhm meter (Agilent Technologies, Palo Alto, Calif., USA) was used for conductivity measurement using a four-wire probe technique. To remove the effect of extraneous voltages such as those arising due to thermal EMF caused by dissimilar materials in the circuit, two measurements were made for every reading: one with the current on and the other with the current off. Using this configuration the meter has a resolution of 0.1 μQ.

Results

The relative density, grain size, and in-plane conductivity were determined for each of the sintered samples, and the results are listed in Table III, together with data for nanocomposites and other materials selected from the prior art as representative of the state of the art preceding this invention. For each entry, the table lists the composition, expressed in terms of the components of the composite (where "SWCN" denotes single-wall carbon nanotubes, "MWCN" denotes multi-wall carbon nanotubes," and "CNT" denotes carbon nanotubes that are unspecified as either single-wall or multi-wall), including the type and grain size of the starting alumina (where known), and the volume percent of each component; the processing conditions including high-energy ball milling ("HEBM") when used and the sintering method, expressed as either electric field-assisted sintering ("SPS" as an abbreviation for "spark plasma sintering"), hot pressing ("HP"—sintering in the absence of an electric field), or high-temperature extrusion ("HTE"); the grain size of the sintered product; the in-plane specific conductivity at 25° C.; and the source of the data, i.e., either the inventors herein or the literature citation (identified in the list following the table). To obtain the relative density, the theoretical density is first calculated as the total of the densities of the components multiplied by their volume percents, and the measured density is then expressed as a percent of the theoretical density (% TD). The term "in-plane conductivity" refers to the conductivity in directions transverse to the direction of compression in the sintering process, and since each specimen is a flat disk, in the plane of the disk.

TABLE III

Compositions, Processing Conditions, Relative Densities, Grain Size and Specific Conductivities (σ) of Composites Within the Scope of the Invention vs. Materials of the Prior Art

| No. | Composition - additive(s) and volume %; matrix in parentheses | Processing Conditions | Relative Density (% TD) | Grain Size (nm) | In-Plane Conductivity (S/m at 25° C.) | Source |
|---|---|---|---|---|---|---|
| (1) | 0% (3Y-TZP only) | SPS/ 1150° C./ 3 min | 100 | — | — | herein |
| (2) | SWCN: 10% (3Y-TZP) | SPS/ 1150° C./ 3 min | 100 | — | 4303 | herein |
| (3) | SWCN: 10% (γ-Al$_2$O$_3$, 32 nm) | SPS/ 1200° C./ 3 min | 97.5 | ~100 | 1293 | herein |
| (4) | SWCN: 15% (γ-Al$_2$O$_3$, 15 nm) | HEBM/ SPS/ 1150° C./ 3 min | 99.2 | ~100 | 2636 | herein |
| (5) | CNT: 8.5%; Fe: 4.3% (γ-Al$_2$O$_3$) | HP/ 1500° C./ 15 min | 88.7 | ~300 | 400-800 | (i) |
| (6) | CNT: 10%; Fe: 4.3% (γ-Al$_2$O$_3$) | HP/ 1500° C./ 15 min | 87.5 | ~300 | 280-400 | (i) |
| (7) | Aligned CNT: 10%; Fe: 4.3% (α-Al$_2$O$_3$) | HTE/ 1500° C./ 15 min | 90 | 500 | 80-160 | (ii) |
| (8) | Aligned CNT: 9.8%; Fe/Co: 3.2% (MgAl$_2$O$_4$) | HTE/ 1500° C./ 15 min | 90 | 800 | 60-2000 | (ii) |
| (9) | MWCN: 20% (polymer) | — | — | — | ~30 | (iii) |

LITERATURE SOURCES (i) Flahaut, E., et al., "Carbon Nanotubes-Metal-Oxide Nanocomposites: Microstructure, Electrical conductivity, and Mechanical Properties," *Acta Mater.* 48: 3803-3812 (2000)

(ii) Peigney, A., et al., "Aligned carbon nanotubes in ceramic-matrix nanocomposites prepared by high-temperature extrusion," *Chem. Phys. Lett.* 352: 20-25 (2002)

(iii) Yoshino, K., et al., "Electrical and optical properties of conducting polymer-fullerene and conducting polymer-carbon nanotube composites," *Full. Sci. Technol.* 7: 695-711 (1999)

The specimens represented by rows (2) through (4) of Table III are the only specimens among those in the Table that fall within the scope of the present invention. The data show that a fully dense composite of 3Y-TZP with 10 volume % single-wall carbon nanotubes can be obtained by spark plasma sintering at 1,150° C. for four minutes, to produce a composite with average grain size less than 100 nm, and an in-plane electrical conductivity of 4,303 S/m. The transverse electrical conductivity, likewise measured but not shown in the table, was only 1.6 S/m. The ratio of the in-plane conductivity to the transverse conductivity exceeds thus three orders of magnitude. The in-plane conductivities of all three specimens in the table that are within the scope of the invention far exceed all reported values in the published literature for carbon nanotube-ceramic composites. The best results in the literature were obtained with composites prepared by high-temperature extrusion (rows (7) and (8) of the table). The conductivity along the extrusion direction for these composites is reported as 2,000 S/m maximum, with a transverse direction conductivity of 60 S/m. Comparable results are obtained by the practice of this invention with alumina, and significantly superior results are obtained with 3Y-TZP.

The foregoing is offered primarily for purposes of illustration and explanation. Further variations, modifications and substitutions that, even though not disclosed herein, still fall within the scope of the invention may readily occur to those skilled in the art.

What is claimed is:

1. In an application requiring the conduction of heat between an exothermic device and a heat sink surface, the improvement comprising interposing between said exothermic device and said heat sink surface a heat-spreading layer of a composite comprised of carbon nanotubes dispersed in a matrix of ceramic material, said composite having been uniaxially compressed in a direction transverse to said heat sink surface to provide said composite with a thermal diffusivity in said transverse direction that is lower than the thermal diffusivity in directions parallel to said heat sink surface.

2. The improvement of claim 1 in which said composite is the product of a process comprising consolidating a mixture of ceramic particles of less than 500 nm in diameter and carbon nanotubes into a continuous mass by uniaxially compressing said mixture while passing a pulsed electric current through said mixture.

3. The improvement of claim 1 in which said composite has a density of at least 90% relative to a volume-averaged theoretical density.

4. The improvement of claim 1 in which said composite has a density of at least 95% relative to a volume-averaged theoretical density.

5. The improvement of claim 1 in which said composite has a density of at least 98% relative to a volume-averaged theoretical density.

6. The improvement of claim 1 in which said composite has a density of at least 99% relative to a volume-averaged theoretical density.

7. The improvement of claim 1 in which said carbon nanotubes are predominantly single-wall carbon nanotubes.

8. The improvement of claim 1 in which said carbon nanotubes constitute from about 1% to about 50% of said composite by volume.

9. The improvement of claim 1 in which said carbon nanotubes constitute from about 2.5% to about 25% of said composite by volume.

10. The improvement of claim 1 in which said carbon nanotubes constitute from about 5% to about 20% of said composite by volume.

11. The improvement of claim 1 in which said ceramic material is a metal oxide selected from the group consisting of alumina, zirconia, magnesium oxide, magnesia spinel, zirconia, titania, cerium oxide, chromium oxide, and hafnium oxide.

12. The improvement of claim 1 in which said ceramic material is alumina.

13. The improvement of claim 1 in which said ceramic material is alumina and said carbon nanotubes are predominantly single-wall carbon nanotubes constituting from about 5% to about 25% of said composite.

14. The improvement of claim 2 in which said process comprises uniaxially compressing said mixture at a pressure of from about 10 MPa to about 200 MPa and a temperature of from about 800° C. to about 1,500° C., and said sintering electric current is a pulsed direct current of from about 250 A/cm$^2$ to about 10,000 A/cm$^2$.

15. The improvement of claim 2 in which said process comprises uniaxially compressing said mixture at a pressure of from about 40 MPa to about 100 MPa and a temperature of from about 900° C. to about 1,400° C., and said sintering electric current is a pulsed direct current of from about 500 A/cm$^2$ to about 5,000 A/cm$^2$.

16. The improvement of claim 1 in which said exothermic device is a microprocessor.

17. In an application requiring the conduction of electricity through an electrically conductive medium in a first direction preferentially relative to a second direction that is transverse to said first direction, the improvement wherein said electrically conductive medium is an electrically conductive composite comprised of carbon nanotubes dispersed in a matrix of ceramic material, said composite having been uniaxially compressed in said second direction to provide said composite with an electrical conductivity in said first direction that is higher than the electrical conductivity in said second direction and higher than the electrical conductivity in a matrix of ceramic material lacking said carbon nanotubes.

18. The improvement of claim 17 wherein said composite is the product of a process comprising consolidating a mixture of ceramic particles of less than 500 nm in diameter and carbon nanotubes into a continuous mass by uniaxially compressing said mixture while passing a pulsed electric current through said mixture.

19. The improvement of claim 17 wherein said composite has a density of at least 90% relative to a volume-averaged theoretical density.

20. The improvement of claim 17 wherein said composite has a density of at least 95% relative to a volume-averaged theoretical density.

21. The improvement of claim 17 wherein said composite has a density of at least 98% relative to a volume-averaged theoretical density.

22. The improvement of claim 17 wherein said composite has a density of at least 99% relative to a volume-averaged theoretical density.

23. The improvement of claim 17 wherein said carbon nanotubes are predominantly single-wall carbon nanotubes.

24. The improvement of claim 17 wherein said carbon nanotubes constitute from about 1% to about 50% of said composite by volume.

25. The improvement of claim 17 wherein said carbon nanotubes constitute from about 2.5% to about 25% of said composite by volume.

26. The improvement of claim 17 wherein said carbon nanotubes constitute from about 5% to about 20% of said composite by volume.

27. The improvement of claim 17 wherein said ceramic material is a metal oxide selected from the group consisting of alumina, zirconia, magnesium oxide, magnesia spinel, zirconia, titania, cerium oxide, chromium oxide, and hafnium oxide.

28. The improvement of claim 17 wherein said ceramic material is yttria-stabilized zirconia and said carbon nanotubes are predominantly single-wall carbon nanotubes constituting from about 5% to about 25% of said composite.

29. The improvement of claim 18 wherein said process comprises uniaxially compressing said mixture at a pressure of from about 10 MPa to about 200 MPa and a temperature of from about 800° C. to about 1,500° C., and said sintering electric current is a pulsed direct current of from about 250 A/cm$^2$ to about 10,000 A/cm$^2$.

30. The improvement of claim 17 wherein said process comprises uniaxially compressing said mixture at a pressure of from about 40 MPa to about 100 MPa and a temperature of from about 900° C. to about 1,400° C., and said sintering electric current is a pulsed direct current of from about 500 A/cm$^2$ to about 5,000 A/cm$^2$.

31. A structural component requiring thermal insulation in high-temperature environments, said structural component comprising a substrate coated with a barrier coating of a composite comprising carbon nanotubes dispersed in a matrix of ceramic material, said composite having been uniaxially compressed in a direction transverse to said surface to provide said barrier with a thermal diffusivity in said transverse direction that are lower than the thermal diffusivity in directions parallel to said surface.

32. A structural component requiring electrical conductivity in a first direction that is substantially lower than in a second direction orthogonal to said first direction, or both, said structural component comprising a substrate coated with a barrier coating of a composite comprising carbon nanotubes dispersed in a matrix of ceramic material, said composite having been uniaxially compressed in a direction transverse to said surface to provide said barrier with an electrical conductivity in said transverse direction that are lower than the electrical conductivity in directions parallel to said surface.

33. The structural component of claim 31 or 32 in which said composite is the product of a process comprising consolidating a mixture of ceramic particles of less than 500 nm in diameter and single-wall carbon nanotubes into a continuous mass by compressing said mixture while passing a pulsed electric current through said mixture.

34. The structural component of claim 31 or 32 in which said composite has a density of at least 95% relative to a volume-averaged theoretical density.

35. The structural component of claim 31 or 32 in which said composite has a density of at least 98% relative to a volume-averaged theoretical density.

36. The structural component of claim 31 or 32 in which said composite has a density of at least 99% relative to a volume-averaged theoretical density.

37. The structural component of claim 31 or 32 in which said carbon nanotubes are predominantly single-wall carbon nanotubes.

38. The structural component of claim 31 or 32 in which said carbon nanotubes constitute from about 1% to about 50% of said composite by volume.

39. The structural component of claim 31 or 32 in which said carbon nanotubes constitute from about 2.5% to about 25% of said composite by volume.

40. The structural component of claim 31 or 32 in which in which said carbon nanotubes constitute from about 5% to about 20% of said composite by volume.

41. The structural component of claim 31 or 32 in which said ceramic material is a metal oxide selected from the group consisting of alumina, zirconia, magnesium oxide, magnesia spinel, zirconia, titania, cerium oxide, chromium oxide, and hafnium oxide.

42. The structural component of claim 31 or 32 in which said ceramic material is alumina.

43. The structural component of claim 31 or 32 in which said ceramic material is alumina and said carbon nanotubes are predominantly single-wall carbon nanotubes constituting from about 5% to about 25% of said composite.

44. The structural component of claim 31 or 32 in which said composite is the product of a process comprising consolidating a mixture of ceramic particles of less than 500 nm in diameter and single-wall carbon nanotubes into a continuous mass by uniaxially compressing said mixture at a pressure of from about 10 MPa to about 200 MPa and a temperature of from about 800° C. to about 1,500° C., while sintering said mixture with a pulsed direct current of from about 250 $A/cm^2$ to about 10,000 $A/cm^2$.

45. The structural component of claim 31 or 32 in which said composite is the product of a process comprising consolidating a mixture of ceramic particles of less than 500 nm in diameter and single-wall carbon nanotubes into a continuous mass by uniaxially compressing said mixture at a pressure of from about 40 MPa to about 100 MPa and a temperature of from about 900° C. to about 1,400° C., while sintering said mixture with a pulsed direct current of from about 500 $A/cm^2$ to about 5,000 $A/cm^2$.

46. The structural component of claim 31 in which said structural component is a combustion gas turbine blade.

* * * * *